United States Patent
Brown et al.

(10) Patent No.: US 10,783,120 B1
(45) Date of Patent: Sep. 22, 2020

(54) SERVICE-BASED STORAGE SYNCHRONIZATION

(71) Applicant: Amazon Technologies, Inc., Seattle, WA (US)

(72) Inventors: Michael F. Brown, Belmont, MA (US); Lawrence Palmer, Concord, MA (US); Adam Daniel Kropelin, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 16/197,923

(22) Filed: Nov. 21, 2018

Related U.S. Application Data

(60) Provisional application No. 62/691,531, filed on Jun. 28, 2018.

(51) Int. Cl.
*G06F 16/178* (2019.01)
*G06F 3/06* (2006.01)
*G06F 16/172* (2019.01)

(52) U.S. Cl.
CPC .......... *G06F 16/178* (2019.01); *G06F 3/065* (2013.01); *G06F 3/067* (2013.01); *G06F 3/0619* (2013.01); *G06F 16/172* (2019.01)

(58) Field of Classification Search
CPC ...... G06F 16/178; G06F 16/172; G06F 3/065; G06F 13/4217; G06F 13/4243; H04J 3/0602; H04J 3/06
See application file for complete search history.

(56) References Cited

U.S. PATENT DOCUMENTS

2015/0199414 A1* 7/2015 Braginsky ............. G06F 16/172 707/613

* cited by examiner

*Primary Examiner* — Ernest Unelus
(74) *Attorney, Agent, or Firm* — Davis Wright Tremaine LLP

(57) ABSTRACT

A file synchronization service generates a listing of files stored on a local data volume by executing a plurality of threads corresponding to directories of the data volume. Files to synchronize with a remote data storage service are identified based on comparison of the listed files with cached data indicative of files stored by the remote data storage service. A plurality of file synchronization requests are sent to the remote data storage service, where the plurality of files are sent in an order that is determined at least partly based on a scaling characteristic of the remote data storage service.

20 Claims, 8 Drawing Sheets

SERVICE-BASED STORAGE SYNCHRONIZATION

CROSS-REFERENCE TO RELATED APPLICATION

This application claims the benefit of U.S. Provisional Application No. 62/691,531, filed on Jun. 28, 2018, entitled "SERVICE-BASED STORAGE SYNCHRONIZATION," the disclosure of which is hereby incorporated herein in its entirety.

BACKGROUND

It has become increasingly common for applications to rely on hosted data storage services. These services may provide various benefits compared to on-premises data storage, such as improved resiliency to data loss, on-demand expansion or contraction of storage capacity, better security, and so on. Moreover, a wide variety of such services exists, and offers a variety of storage paradigms such a file-based, block-based, object-oriented, and so forth. However, synchronizing data between on-premises storage and hosted data storage services remains challenging.

BRIEF DESCRIPTION OF THE DRAWINGS

Various techniques will be described with reference to the drawings, in which.

DETAILED DESCRIPTION

Figure 1:
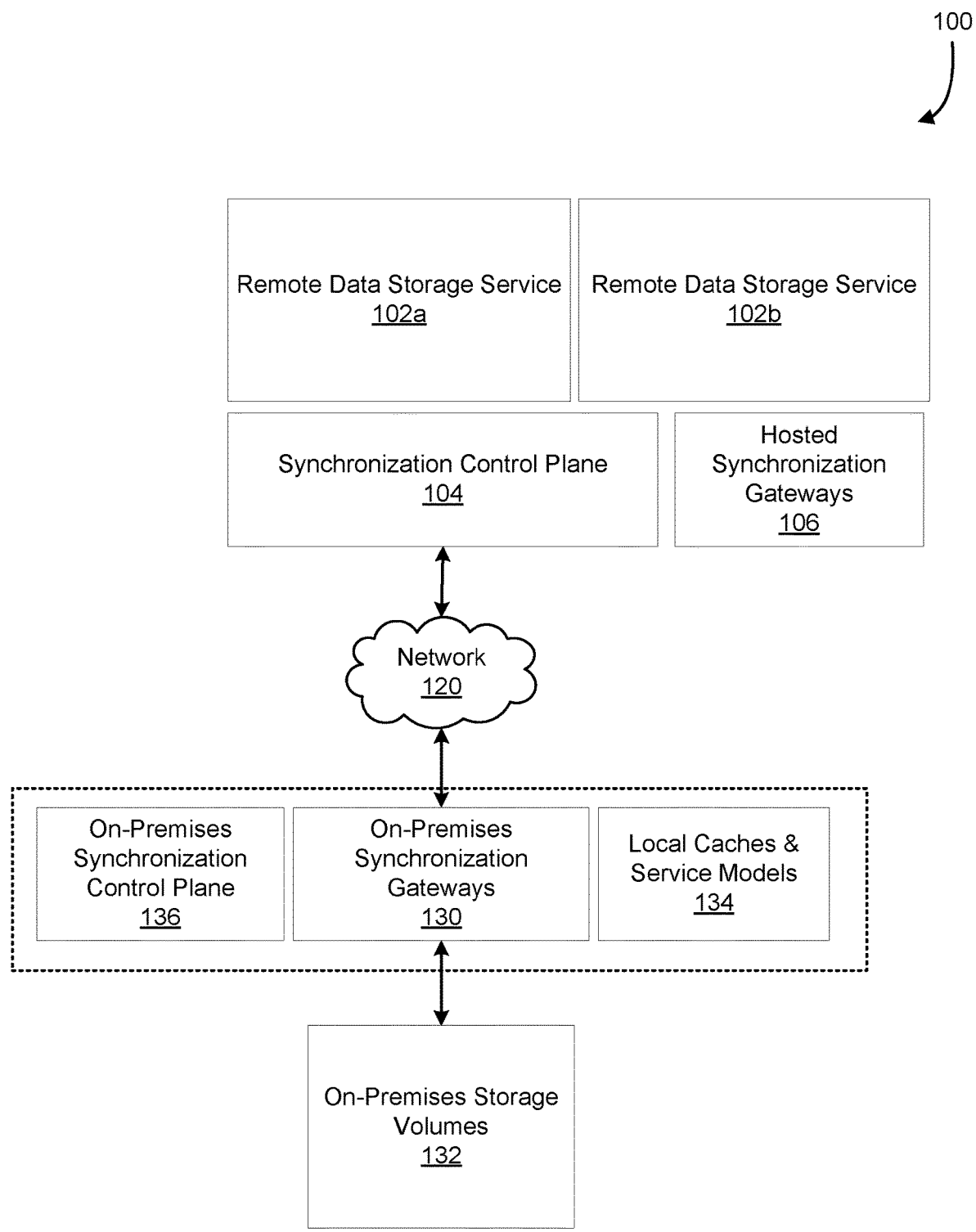
FIG. 1 illustrates an example synchronization service.

Disclosed herein are systems, methods, and computer program products related to integrating data and applications with one or more remote data storage services. In particular, the disclosed techniques relate to synchronizing data stored at a client's premises with one or more remote data storage services. Moreover, the disclosed techniques are adapted to leverage and adapt to characteristics of a remote data storage service, such as the scaling characteristics of a remote data storage service.

In an example, a technique for synchronizing on-premises data with a remote data storage services comprises first receiving a request to synchronize a data volume with a remote data storage service. The technique further involves generating a listing of files stored on the data volume by a recursive process in which threads are spawned for the subdirectories of the data volume. Each thread contributes to the listing by identifying files in its corresponding subdirectory, and obtaining metadata for the files.

The metadata for the files stored on the on-premises storage volume are then compared to a local cache of metadata for files stored by the remote data storage service. The techniques described herein, in at least some instances, involve performing as much of the synchronization work locally as possible. To this end, the phase of synchronization which involves identifying files that require synchronization is performed against a local cache of metadata for files stored by the remote service. As used herein, the terms "local cache" or "local cache of metadata," unless explicitly stated otherwise, refer to a cache of metadata that represents files stored by the remote data service. The metadata cache may contain a listing of files stored by the remote data storage service, as well as attributes corresponding to those files.

The technique further involves comparing metadata from the locally-generated file listing to metadata in the local cache of metadata, and thereby identifying files to be synchronized between the local volume and the remote data storage system. Various comparison techniques may be employed to identifying discrepancies, such as comparing names, file sizes, modification dates, checksums, and so forth.

The efficiency of the synchronization is further enhanced, in at least some instances, by the application of various techniques for populating the local cache of metadata. As noted, a wide variety of data storage services may be employed. Each storage service may provide a distinct set of abilities, and may have differing characteristics, which may be leveraged. In some instances, each service involved in synchronization is modelled locally, so that these abilities and characteristics may be employed in the synchronization process. In the case of populating a local cache, for example, the model may indicate that certain bulk operations are available for retrieving metadata, or that the values of certain metadata characteristics may be predicted rather than requested from the service.

The technique further involves sending request to insert, update, or delete the files that have been identified as needing synchronization. This process is also, in at least some instances, highly parallelized. For example, each of the spawned threads may identify files in its corresponding directory that require synchronization, and send corresponding requests to the data storage service for each of the identified files.

It should be noted that the aforementioned techniques are adapted to characteristics of remote data storage services that may not be present in more conventional synchronization problems. For example, the scaling characteristics of data storage services may be leveraged using the parallelization techniques described herein. Likewise, data storage services may have more variance in the services they provide and the efficiency with which those services operate. The described techniques, in at least some instances, help to account for these variances. Accordingly, in various embodiments, synchronization requests are sent to a data storage service in a manner that is selected, based on a local understanding of the data storage service, to optimize the service's efficiency in processing the synchronization requests.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example synchronization service 100. A synchronization service 100 can comprise one or more remote data storage services 102, a synchronization control plane 104, and one or more hosted synchronization gateways 106. These elements of the system may communicate via a network 120 with on-premises synchronization gateways 130. These act as local agents in the synchronization of data between an on-premises storage volume 132 and one or more of the remote data storage services 102. The on-premises synchronization gateways 130 may access local caches and service models 134 corresponding to the remote data storage services 102.

In an embodiment, a synchronization control plane 136, one or more synchronization gateways 130, and one or more local caches and services models 134 are hosted on an on-premises computing device. For example, an application server (similar to those depicted by FIG. 8, but located at a customer premises or other remote location) might be configured to host a synchronization control plane 136, one or more synchronization gateways 130, and one or more local caches and services models 134.

In an embodiment, on-premises storage volumes 132 are storage devices or storage device portions whose contents are to be synchronized with one or more of the remote data storage services 102. For example, on-premises storage volumes 132 can be solid-state drives, mechanical disk drives, storage area networks ("SAN"), relational databases, or other means of storing data on the premises of a customer. The on-premises storage volume 132 can maintain files or records; these files or records may be synchronized with one or more of the remote data storage services 102.

A remote data storage service 102, in an embodiment, is a hosted facility for storing and retrieving data. For example, in an embodiment a remote data storage service 102a corresponds to a file-based storage service, and a remote data storage service 102b corresponds to an object-based storage service. It will be appreciated that these examples are intended to be illustrative, and should therefore not be construed so as to limit the scope of the present disclosure to only the specific examples provided.

A synchronization control plane 104, in an embodiment, is a module that manages and coordinates synchronization between an on-premises storage volume 132 and a remote data storage service 102. A module, as described herein, comprises a non-transitory memory with processor-executable instructions that, when executed, perform the functions attributed herein to the respective module. In an embodiment, activities of the synchronization control plane 104 include instantiating hosted synchronization gateways 106, facilitating communication between the hosted synchronization gateways 106 and on-premises synchronization gateways 130, and facilitating communication between the hosted synchronization gateways 106 and the remote data storage services 102. In some instances, an on-premises synchronization control plane 136 performs functions similar to those of the synchronization control plane 104, as applied to operations perform on-premises.

A hosted synchronization gateway 106, in an embodiment, is a module that executes synchronization tasks against one or more of the remote data storage services 102. A synchronization task, in an embodiment, is an operation on a discrete unit of storage, such as a single file, object, record, key-value pair, and so forth. Example operations include storing an object, deleting an object, storing a file, patching the contents of a file, updating a record, and so on. A given synchronization gateway 106 will typically execute many synchronization tasks.

In an embodiment, the synchronization control plane 104 coordinates the instantiation of a virtual machine on which a synchronization gateway 106 is hosted. The synchronization control plane 104 may instantiate virtual machines to scale according to the volume and workload of synchronization tasks.

In an embodiment, the synchronization process is parallelized. For example, in an embodiment, a recursive scan of the on-premises storage volume generates synchronization tasks which can be executed by one or more of the on-premises synchronization gateways 130 in parallel. These tasks may, in turn, cause corresponding synchronization tasks to be executed by one or more of the hosted synchronization gateways 106.

A local cache 134, in an embodiment, stores metadata from one or more of the remote data storage services 102. In an embodiment, the metadata is indicative of files or other synchronization units stored by a remote data storage service 102. For example, the metadata might comprise a listing of files and associated data, such as size, modification time, checksum value, and so forth. The metadata might also include timestamp information, e.g., to indicate how current the metadata is.

In addition to the local cache 134, embodiments may also comprise local models of the remote data storage services. This refers to a module or data describing certain aspects of the behavior of the remote data storage service. For example, in an embodiment a service model is able to predict values for the metadata stored in the local cache 134. This can include predicting the storage location of a file stored by the remote data storage service, and the prediction can then be used to determine whether or not to synchronize a locally stored file.

In an embodiment, the on-premises synchronization gateways 130 access the local cache 134 to identify synchronization tasks to propagate to the hosted synchronization gateways 106. For example, a first task to check status of a file $F_1$ might determine, based on data in the local cache 134, that identical copies of $F_1$ are already stored on the on-premises storage volume 132 and a remote data storage service 102. A second task to check status of a file $F_2$ might determine that the file is out-of-date on a remote data storage service 102. The on-premises synchronization gateway 130 might then cause an associated synchronization task, to update the file $F_2$ on the remote data storage service 102, to be instantiated on one of the hosted synchronization gateways 106.

Figure 2:
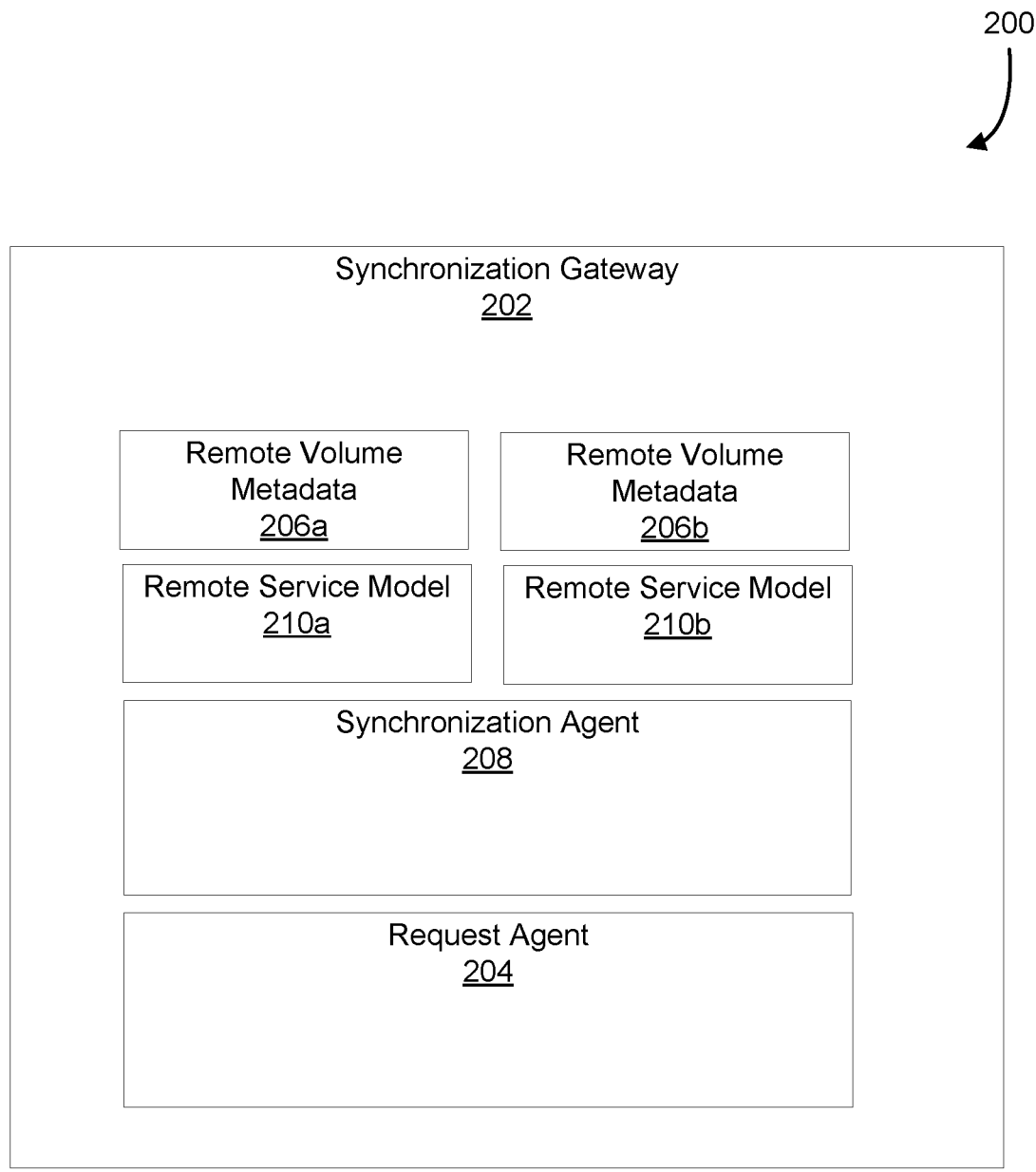
FIG. 2 illustrates an example synchronization gateway.

Further aspects of the various embodiments may be appreciated in view of the example 200 of FIG. 2, which illustrates an example synchronization gateway 202. In an embodiment, the synchronization gateway 202 of FIG. 2 corresponds to the synchronization gateways depicted in FIG. 1. Similar architectures may be employed for on-premises and hosted synchronization gateways.

In an embodiment, a synchronization gateway 202 comprises a request agent 204 and a synchronization agent 208. The request agent 204 and synchronization gateway 202 are modules in communication with or sub-components of the synchronization gateway 202. In some embodiments, the request agent 204 and synchronization gateway 202 are be combined into an integrated module.

The request agent 204, in an embodiment, receives and transmits requests to perform synchronization tasks. For example, the request agent 204 might receive a request to synchronize a file held on a local storage volume, or transmit a request to synchronize a file to a remote data storage service.

The synchronization agent 208, in an embodiment, processes requests to perform synchronization tasks. The nature of a synchronization task depends in part on the direction of its initiation. For example, in some instances, the synchronization agent 208 may process the sending of a request to synchronize a file known to have recently changed in the local volume. In other instances, the synchronization agent 208 may process a received request to update a local copy of a file that was modified on the remote data store.

In the first case, the synchronization agent 208 might, for example, send the contents of the file to the remote data store. In the second case, the synchronization agent 208 might facilitate receiving the contents of the file from the remote data store, and perform operations to update the local version of the file based on the received contents.

As depicted in FIG. 2, the synchronization gateway 202 may comprise, or have access to, local caches of remote volume metadata 206. In an embodiment, the volume metadata 206 comprises metadata corresponding to the files stored by the corresponding remote data storage service. Alternatively, for a synchronization gateway 202 operating off-premises (i.e., at a hosted location), the metadata corresponds to files stored by the on-premises storage device whose contents are being synchronized. In other words, the volume metadata 206 is a local cache corresponding to a remote data store.

In an embodiment, the volume metadata 206 comprises modification timestamps.

In an embodiment, the volume metadata 206 comprises storage location data. In an embodiment, the storage location data is indicative of a storage node on which a file is stored, or is likely to be stored, by a remote data storage service. This information may, in some instances, permit the synchronization gateway 202 to communicate directly with the storage node.

The synchronization gateway 202 may also comprise, or have access to, a remote service model 210. In an embodiment, the remote service model 210 comprises information or instructions for predicting metadata values.

In an embodiment, the predictions performed by the remote service model 210 include predicting storage locations. For example, if the data storage service hashes a file name or key value to determine a storage location for a file or record, the remote service model 210 may perform a similar calculation to identify a likely storage location for a new file or record. This approach can help reduce communication volume with the storage service, since a round-trip to fetch the same metadata value can be avoided based on the prediction.

Figure 3:
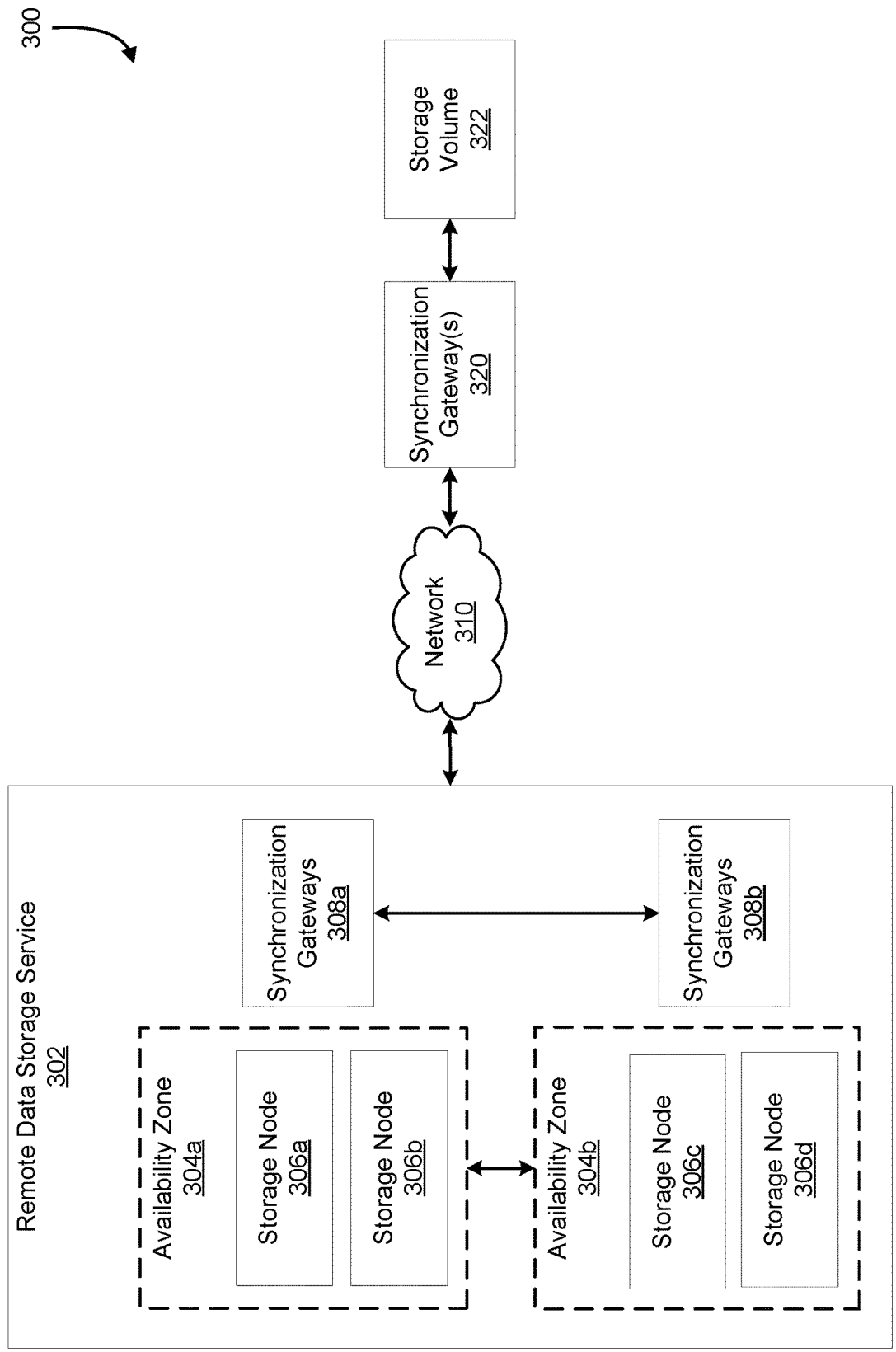
FIG. 3 illustrates an example of synchronizing between a storage volume and a remote data storage service.

FIG. 3 illustrates an example 300 of synchronizing between a storage volume and a remote data storage service. In the example of FIG. 3, an on-premises storage volume 322 is synchronized with a remote data storage service 302, via the operation of a local synchronization gateway 320. The synchronization gateways 308, 320 may correspond to the synchronization gateways 106, 130 depicted in FIG. 1.

The depicted remote data storage service 302 may comprise various storage nodes 306 separated into availability zones 304. An availability zone refers to a location or facility that is isolated from failures occurring in other zones. For example, the availability zones 304 depicted in FIG. 3 might be located in separate geographic regions, on separate power grids, in order to ensure that a power failure in a first zone 304a does not affect the operation of the storage nodes 306c,d in the other zone 304b.

In an embodiment, a first set of synchronization gateways 308a are associated with operations on the first availability zone 304a, and a second set of synchronization gateways 308b are associated with operations on the second availability zone 304b. The actual number of synchronization gateways 308 may vary according to demand and parallelization of the synchronization process, as described elsewhere herein.

An on-premises synchronization gateway 320 may transmit synchronization tasks to the remote data storage service 302. A synchronization task can, for example, comprise a request to store a file on the remote data storage service 302. There may be additional, related operations, such as copying the stored file between availability zones 304.

In an embodiment, the on-premises synchronization gateway 320 requests that separate synchronization operations be performed on each of the availability zones 304a,b. For example, a first synchronization task might be sent to a synchronization gateway 308a associated with the first availability zone 304a, and a second synchronization task sent to a synchronization gateway 308b associated with the second availability zone 304b.

In another embodiment, improved inter-zone communications are leveraged. This may, for example, occur when an embodiment uses a local model of the remote data storage service 302 to determine that certain operations may leverage improved efficiency in inter-zone communication, as compared to communications between the premises and the remote data storage service 302 via the network 310. In this instance, the on-premises synchronization gateway 320 sends the synchronization tasks to a synchronization gateway 308a in the first availability zone 304a, and relies on the remote data storage service 302 to perform the replication.

In another embodiment, greater efficiency in inter-zone communication is leveraged to perform synchronization tasks in addition to replication. For example, a synchronization task sent to a synchronization gateway 308a in the first zone 304a might request operations to be performed on, or data to be retrieved from, a storage node 306c,d in the second zone 304b.

Figure 4:
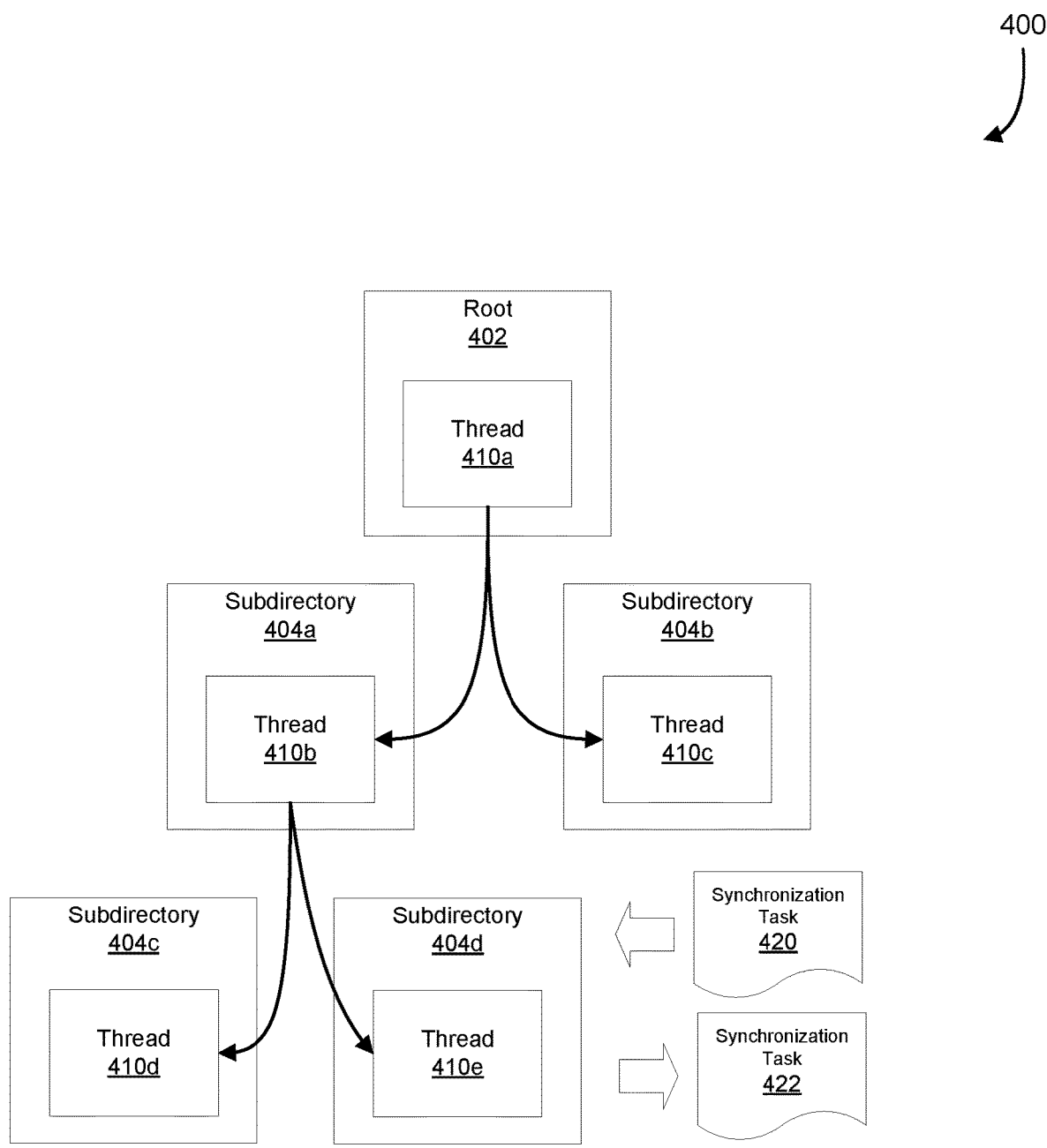
FIG. 4 illustrates an example of synchronization parallelism.

In an embodiment, synchronization of a storage volume is parallelized according to a structure of the data store. FIG. 4 illustrates an example 400 of synchronization parallelism for a storage volume having a recursive, directory-based structure. For example, the root 402 of the storage volume may have two subdirectories 404a,b. One of these subdirectories 404a might itself comprise two subdirectories 404c,d. It will be appreciated that this example is intended to be illustrative of hierarchical storage structures, and as such should not be construed so as to limit the scope of the present disclosure to only the specific examples provide.

The synchronization is parallelized in part by creating a thread corresponding to locations in the directory. For example, in the example of FIG. 4, a thread 410a is created to facilitate synchronization of the root 402, and additional threads 410b,c,d,e to facilitate synchronization of the subdirectories 404a,b,c,d. In some cases and embodiments, a thread is created for each directory, although this is not required. In some cases and embodiments, threads are created when doing so would result in a more even distribution of work among the threads. For example, multiple threads might be created to handle a directory with a large number of files, but not for a sub-directory with only a few files.

A synchronization task, such as the depicted incoming synchronization task 420, may be executed on a thread corresponding to the location. For example, to store a file within a given subdirectory 404*d*, a synchronization task 420 is created and then executed on a thread 410*e* corresponding to the location.

A synchronization task, such as the depicted outgoing synchronization task 422, may be created by a thread corresponding to the location. For example, to copy a file within a given subdirectory 404*d* to another location, an output synchronization task 422 is created and sent to be performed by a remote synchronization gateway.

File synchronization requests, such as the depicted synchronization tasks 422, can be sent in groups based on a predicted storage location. The predicted storage location, for example, can correspond to a predicted storage node. Synchronization tasks 422 can be grouped so that each node of the storage service is utilized more efficiently. For example, a group of tasks can be sent to each node, where the amount of work in each task (as determined, for example, by file size) approximates each nodes capability to perform the work at a sustained rate. Throttling of the synchronization tasks can be controlled, similarly, based on predicted location.

As may be appreciated in view of FIGS. 3 and 4, synchronization between a local storage volume and a remote data storage service comprises, in various instances, a variety of synchronization operations in both directions. For example, a change to a file in a given storage location might result in a number of synchronization tasks, directed to different storage services, different storage locations within a particular storage service, and so forth.

Figure 5:
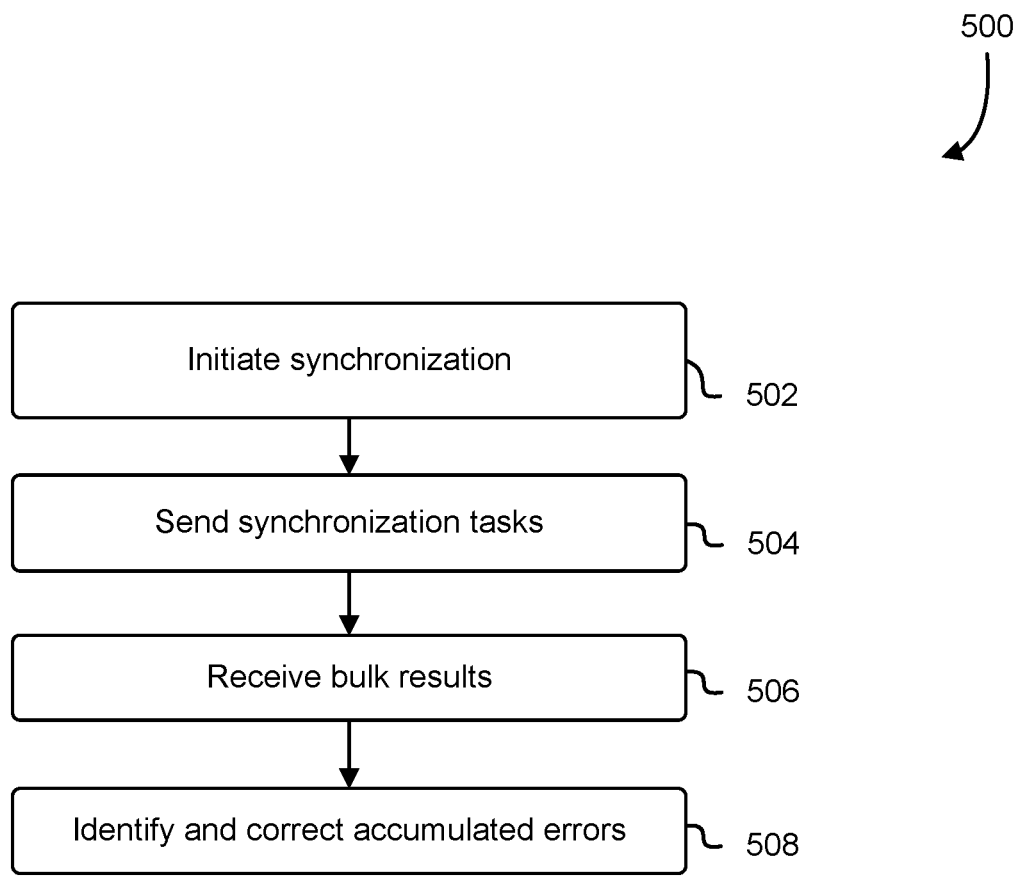
FIG. 5 is a flow diagram depicting deferral of synchronization status checks.

Embodiments may optimize status checking during synchronization by deferring status checks. FIG. 5 is a flow diagram depicting an example 500 of deferring synchronization status checks. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

In an embodiment, the example 500 is performed by the systems and modules depicted in FIG. 1, including but not limited to a synchronization control plane 136 and/or synchronization gateway 130.

At 502, the system begins a synchronization process. As explained herein, the synchronization process may be initiated by traversing a storage volume and creating threads for locations on the storage volume. The threads, in turn, spawn various synchronization tasks.

At 504, the synchronization gateway begins sending synchronization tasks to a remote synchronization gateway. For example, a synchronization gateway might send synchronization tasks to a remote gateway, in order to have the remote gateway perform the synchronization operation on a remote data storage service.

Note that in the depicted embodiment, the synchronization gateway does not wait for confirmation that a particular synchronization operation has succeeded. Further, the synchronization gateway does not receive asynchronous confirmation. Instead, a bulk-processing approach is employed in order to reduce the network traffic that synchronous or asynchronous confirmation messages would involve, if sent on a per-task basis. The system therefore sends acknowledgement in bulk, i.e., pertaining to a significant number of synchronization tasks. Thus, at 506, the synchronization gateway receives a bulk confirmation regarding the status of the synchronization tasks.

A disadvantage of this approach is that there is a potential for errors to accumulate. For example, if a first synchronization task fails, then any subsequent synchronization tasks that are dependent on the first synchronization task may also fail.

At 508, the system identifies and corrects for any accumulated errors. In an embodiment, this involves analyzing the received bulk results to identify synchronization tasks failures that are the root cause of a subsequent series of failures. These root causes can then be corrected and the failed tasks performed again.

Figure 6:
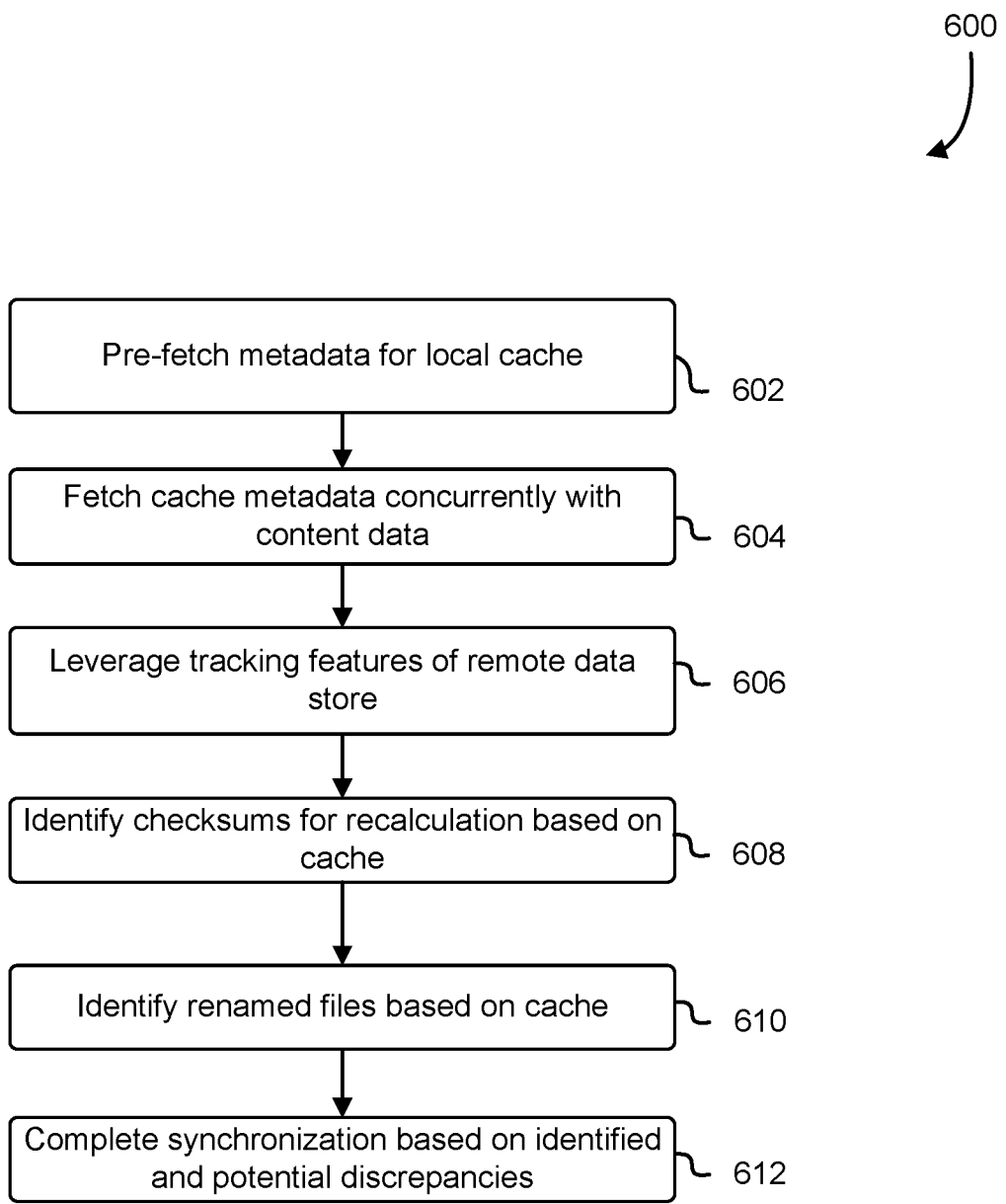
FIG. 6 is a flow diagram depicting an example process for identifying files for synchronization based on a local metadata cache.

FIG. 6 is a flow diagram depicting an example process of identifying files for synchronization based on a local metadata cache. Although depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

In an embodiment, the example 600 is performed by the systems and modules depicted in FIG. 1, including but not limited to a synchronization control plane 136 and/or synchronization gateway 130.

At 602, the synchronization gateway or control plane pre-fetches metadata for the local cache. In various embodiments, the synchronization gateway and/or local control plane attempt to perform as many synchronization operations as possible on local data, in order to minimize potentially costly or time-consuming activities on a remote data storage service. To further this goal, the system proactively populates a local cache of metadata describing the corresponding repository of files at the remote data store.

In an embodiment, populating the local metadata cache comprises fetching metadata during local idle time. Thus, when the synchronization gateway and/or local control plane is not actively synchronizing files, it may request and receive updates to metadata for the remotely stored versions of the local directories being synchronized.

In another embodiment, populating the local metadata cache comprises receiving metadata sent by a remote data storage service. A remote data storage service may, for example, send metadata during times when the local synchronization gateway or control plane is relatively inactive. In some cases, the remote data store may periodically send bulk updates.

At 604, the synchronization gateway or control plane fetches cache metadata concurrently with content data. This approach minimizes the round-trips needed to obtain relevant metadata. For example, when a file is downloaded from a remote data storage service, the local gateway or control plane also obtains metadata for that file, and possibly for any other files that have changed recently. In this way, round-trips are minimized while the local cache of metadata is kept as up-to-date as possible.

At 606, the synchronization gateway or control plane leverages tracking features of the remote data store. For example, certain remote data storage services may provide capabilities related to the identification of files that have changed. Using these capabilities, the local gateway or control plane may be able to determine that certain files have been changed at the remote store, and thereby bypass the need to identify changes files by examining metadata.

At 608, the synchronization gateway or control plane uses the local cache to identify checksums to recalculate. In some embodiments, checksums are used as a means of determining whether or not two versions of a file are equivalent. Computation of a checksum can be expensive. However, re-computation of the checksum can be skipped or made more efficient using metadata stored in the local cache. The metadata can, for example, include checksum values for the versions of files stored by the remote data store. In addition, in some instances the metadata can comprise timestamps usable to determine whether re-computation of the local or remote checksums is needed to determine whether two files are different.

At 610, the synchronization gateway or control plane uses the local cache to identify files that have been renamed. This is done to prevent synchronization of file contents when, in fact, the only difference is the name of the file. Identifying renamed files can be done by matching various metadata characteristics of local files to corresponding characteristics in the metadata cache. These can include size, modification data, and checksum.

At 612, the synchronization gateway or control plane completes the synchronization process based on the identified and potential discrepancies between the local volume and the remote volume. For example, in an embodiment a synchronization task is generated for each local file that has been determined to be out of sync with respect to a corresponding file on the remote data store, or for which no corresponding file exists at the remote data store.

Figure 7:
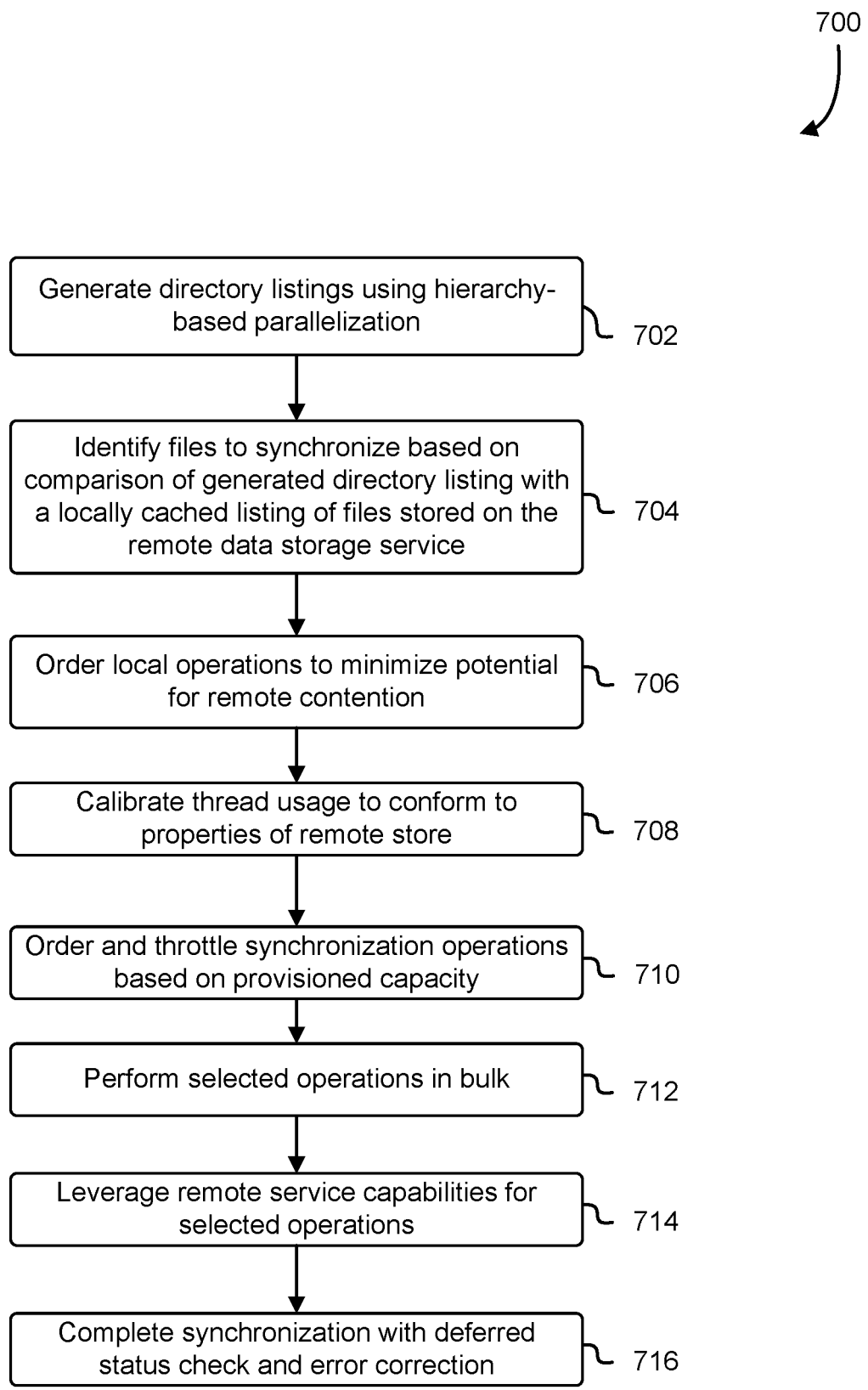
FIG. 7 is a flow diagram depicting an example process for synchronizing files.

FIG. 7 is a flow diagram depicting an example of synchronizing files with a remote data store. Although depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

In an embodiment, the example 700 is performed by the systems and modules depicted in FIG. 1, including but not limited to a synchronization control plane 136 and/or synchronization gateway 130. The operations depicted in FIG. 7 may be performed, for example, in response to a request to synchronize a data volume with a remote data storage service. In an embodiment, for example, the request is received or otherwise obtained via a network message transmitted over a network and stored in a network interface. In another example, the request is received or otherwise obtained from a module, such as module that determines to request a synchronization and sends, via a software interface, a request to synchronize a data volume.

At 702, the synchronization gateway or control plane generates directory listings using hierarchy-based parallelization. This may comprise to creating threads that correspond to locations within a hierarchy, such as a hierarchical directory listing. For example, the synchronization gateway or control plane may spawn threads corresponding to directory locations. FIG. 4 depicts an example of creating threads corresponding to directory locations, according to a hierarchy-based parallelization technique.

In an example, a synchronization gateway or control plane might execute a plurality of threads corresponding to the directories of the data volume to be synchronized. The threads may be executed recursively. For example, a thread might be executed to generate a file listing for a top-level directory, and in turn spawn additional threads corresponding to subdirectories within the top-level directory. These threads might, in turn, spawn additional threads. The use of a plurality of threads, and the recursive spawning of the threads, may provide the technical advantage of increasing the parallelism of the replication process and permitting greater leveraging of the scaling characteristics of the remote data storage service.

At 704, a synchronization gateway or control lane identifies files to synchronize with the remote data storage service based at least in part on a comparison of the listing of files to a locally cached listing of files stored on the remote data storage service.

In some instances, identifying files to synchronize comprises direct comparison of file names and locations on the local storage volume to corresponding file names and locations on the remote data storage service. Note, however, that these may be different. For example, the name of a file stored on the local storage volume might be different than the name of an equivalent file stored by the remote data storage service. Similarly, the storage location (such as a file's subdirectory) might be somewhat different on the remote data storage service. There may, for example, be instances where files in the same directory on the local storage volume are stored on different storage nodes, and consequently in different directories, by the remote data storage service.

In some instances, attributes of corresponding files may be different. For example, attributes such as file size, modification data, or creation data might be different on the local storage volume than they are on the remote data storage service. For example, the data storage service might record the creation time of a file as a time that the file was first stored by the service, rather than the time the file was created on the local volume. Likewise, storage allocation might be different on the remote data storage service, resulting in the same file taking up a different amount of space locally than on the remote data storage service.

In an embodiment, a model of the remote data service may operate locally to facilitate the comparison and the identification of files requiring synchronization. The model can comprise software code, such as a software module, capable of simulating or otherwise predicting the behavior of the remote data storage service. In particular, the model may, in various embodiments, be able to predict various attributes associated with files stored by the remote data storage service, and to identify the locations of the files. Location may refer to file system location, storage node, storage cluster, affiliation with other files, and so forth. As explained in more detail herein, the location may be leveraged when sending instructions to synchronize files, in order to improve parallelism and minimize the likelihood that contention or over-use of an individual storage node will unduly slow the synchronization process. For example, file synchronization tasks can be sent based on predicted contention at the remote data storage service.

The synchronization gateway or control plane may then send a plurality of file synchronization requests to the remote data storage service. The file synchronization requests sent in an parallel order that is based at least in part on a scaling characteristic of the remote data storage service. Here, order refers to the sequence in which requests are sent to various recipient points of the data storage service. Parallel refers to the number of requests that may be pending at any one time. For example, if only one request is pending at any one time, the process is essential serial. If the maximum amount is very high, then a high degree of parallelism is employed. A scaling characteristic refers to factors such as the likelihood of contention, the efficiency of nodes of the storage service, throttling and synchronization requirements, and bulk operations availability. Operations 706 to 712 depict aspects of sending synchronization requests in an order that is based on a scaling characteristic of the remote data storage service.

At 706, the synchronization gateway or control plane orders operations to minimize the potential for contention at the remote data store. In some instances, contention refers to blocking caused by the need for a process or thread to write to or read from a location while another process is using the same location. The synchronization gateway or control plane may cause synchronization tasks to be sent in an order that would tend to minimize such contention.

In an embodiment, for example, the synchronization gateway or control plane orders outgoing synchronization tasks so that tasks involving the same location are separated by at least a threshold amount of time. The threshold, in some cases, can be based on a predicted time for performing any prior operations involving the same location. With reference to FIG. 2, the ordering may leverage the capabilities or data of a remote service model 210 to determine how much temporal spacing is to be used.

In some instances, ordering is based on other details provided by a remote service model. For example, in an embodiment, a model is used to determine the storage nodes that would be impacted by various synchronization tasks. Note that there may not be a direct correspondence between the directory location of a local file and where it is stored remotely. For example, a remote data storage service may employ a hashing technique to route storage requests to storage nodes. However, a remote service model corresponding to the service may emulate the hashing technique to predict where a given file would be stored. Using this information, the system can identify which storage nodes are affected by which synchronization tasks, and space the synchronization tasks accordingly.

At 708, the synchronization gateway or control plane calibrates thread usage to conform to parallelism properties of the remote data store. For example, the remote data store may employ storage devices, such as solid-state drives, that are relatively good at writing data in parallel. For such services, more parallelism may be employed than would be optimal against other services, such as those based on spinning disks, which perform poorly when asked to write data in parallel.

At 710, the synchronization gateway or control plane orders and throttles synchronization operations sent to the remote data store, based on provisioned capacity limitations. Some remote data storage services may have restrictions on how much data they can process in a given timeframe. These limits may be absolute in some cases, or may result in additional costs to the customer of the data storage service. To account for these restrictions, a synchronization gateway or control plane can limit the rate at which synchronization tasks are sent to a given remote data storage service.

At 712, the synchronization gateway or control plane performs certain, selected synchronization operations in bulk. Leveraging bulk operations may comprise the following steps. First, the bulk operations supported by the remote data storage service are discovered. For example, some services may have a bulk delete capability, or a bulk file upload capability. An indication that these capabilities are available may be provided by a remote service model 210, as depicted in FIG. 2. In other instances, the service may provide a discovery capability to indicate what bulk operations are possible.

At 714, the synchronization gateway or control plane leverages additional capabilities of the remote data store to perform certain synchronization operations. These additional operations may include, in various embodiments, optimizations regarding replicating or transferring files between availability zones.

As depicted by steps 706-714, embodiments may send file synchronization requests to the remote data storage service, based on a characteristics of the remote data storage service, so that throughput of the file synchronization requests is optimized. Here, throughput refers to the rate or efficiency with which the synchronization requests can be sent to and processed by the remote data storage service. This may, in some embodiments, include the rate or efficiency of the remote data storage service in storing the files. Here, optimizing the throughput refers to causing the throughput to be adjusted and, in various embodiments, improved, rather than suggesting that throughput is necessarily made optimal. In embodiments, the optimization of throughput is optimized based on one or more of the characteristics of the remote data storage service that are described in steps 706-714, such a potential for contention, capacity for parallelism, provisioned capacity, bulk operations support, and service capabilities.

At 716, the synchronization gateway or control plane completes the synchronization process, using deferred status checking and error correction. In an embodiment, synchronization tasks are transmitted to a remote synchronization control plane, and from there disseminated to a hosted synchronization gateway. For example, see the synchronization control plane 104 and hosted synchronization gateways 106 depicted in FIG. 1. These may be transmitted without waiting for a synchronous indication that a given task has succeeded. By deferring error checking, embodiments may therefore use an asynchronous request mechanism to further improve the efficiency of the synchronization. Further explanation of this operation is given with respect to FIG. 5.

As depicted by operation 716, the synchronization can be performed with deferred status checks and error correction. For example, the synchronization gateway or control plane may identify accumulated errors caused by a failure in at least one of a plurality of file synchronization requests, and then correct the accumulated error by sending additional file synchronization requests. Accumulated errors may occur when a particular task fails, and subsequent dependent tasks also fail. For example, if a task to create a directory were to fail, any subsequent tasks to store a file in that directory would also fail. The deferral of status checks may have a number of technical advantages in the context of synchronization with a remote data storage service. For example, the cost of a round-trip to the remote data storage service may be comparatively high. Deferring the status checks avoids the costs of these round trips, and also allows for the storage service to identify and correct an underlying cause of an accumulated error. For example, a storage service might be able to automatically correct for insufficient storage conditions between the time of the initial failure and the time the corrective tasks are sent.

As one skilled in the art will appreciate in light of this disclosure, certain embodiments may be capable of achieving certain advantages, including some or all of the following: (1) improved efficiency in synchronizing data between on-premises storage devices and remote data storage services, (2) improved integration between on-premises data storage and remote data storage services, and (3) reduced network traffic when synchronizing data between an on-premises volume and a remote data storage services.

Figure 8:
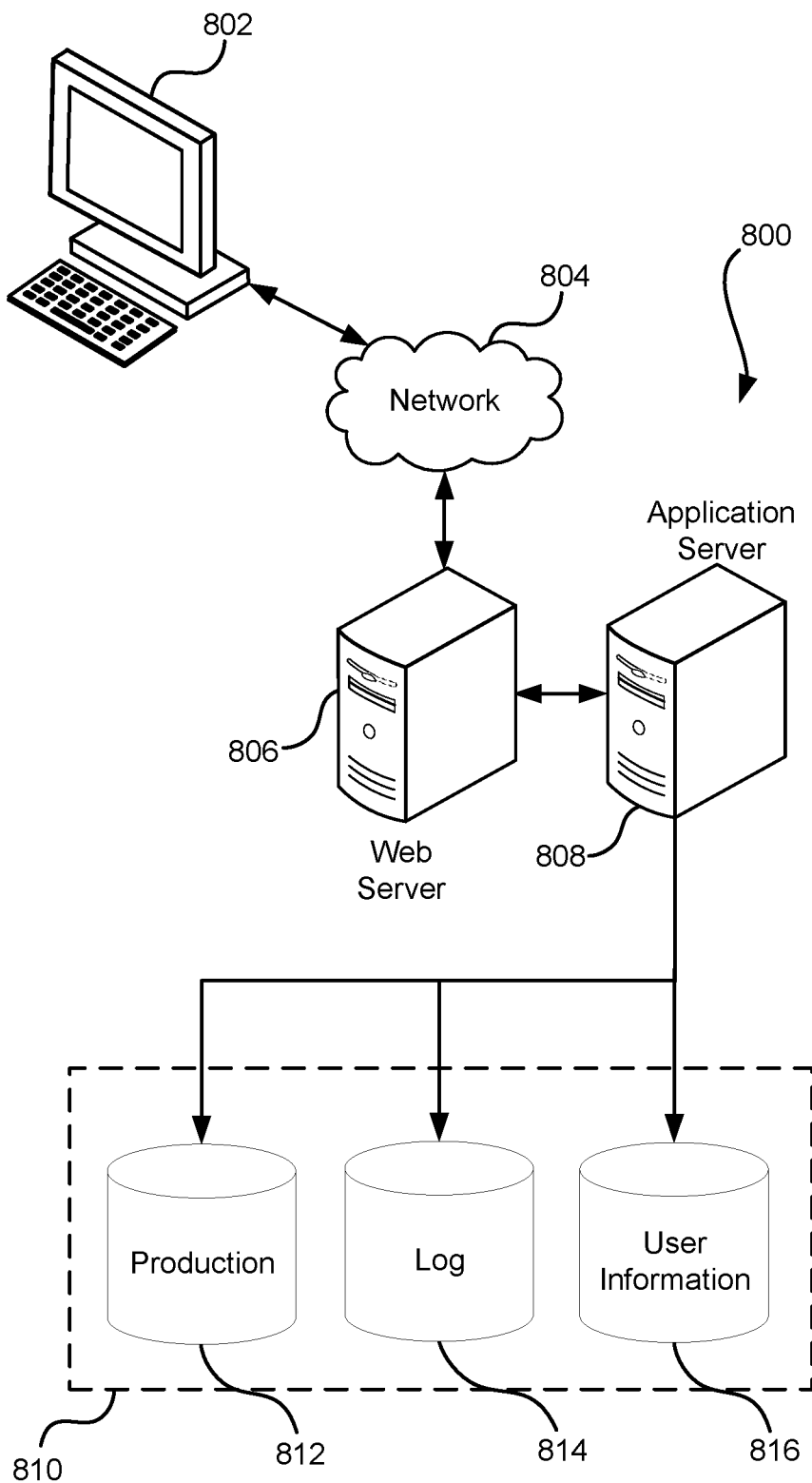
FIG. 8 illustrates a system in which various embodiments can be implemented.

FIG. 8 illustrates aspects of an example system 800 for implementing aspects in accordance with an embodiment.

As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   a memory that stores computer-executable instructions that, in response to being executed by the at least one processor, cause the system to:
     receive a request to synchronize one or more files of a data volume with one or more files of a remote data storage service;
     execute a plurality of threads corresponding to directories of the data volume, wherein the plurality of threads collectively generates a listing of files stored on the data volume;
     identify a plurality of files to synchronize with the remote data storage files stored on the remote data storage service; and
     send a plurality of file synchronization requests to the remote data storage service, wherein the plurality of file synchronization requests are sent in an order determined, based at least in part on a predicted storage location of the one or more files on the remote data storage service, to optimize processing of the plurality of file synchronization requests by the remote data storage service.

2. The system of claim 1, the memory storing further instructions that, in response to being executed by the at least one processor, cause the system to:
   determine to synchronize a file stored locally based at least in part on the predicted storage location of the file on the remote data storage service.

3. The system of claim 1, wherein the plurality of file synchronization requests are determined based at least in part on at least one of predicted contention at the remote data storage service.

4. The system of claim 1, the memory storing further instructions that, in response to being executed by the at least one processor, cause the system to:
   identify accumulated error caused by a failure in at least one of the plurality of file synchronization requests; and
   correct the accumulated error by at least sending a second plurality of file synchronization requests.

5. The system of claim 1, wherein the predicted storage location is indicative of a where the one or more files are likely to be stored on the remote data storage service.

6. A computer-implemented method, comprising:
   generating a listing of files stored on a data volume by at least executing a plurality of threads corresponding to directories of the data volume;
   identifying a plurality of files stored on the data volume to synchronize with files stored on a remote data storage service, the identifying based at least in part on comparing files in the listing of files to cached data indicative of files stored on the remote data storage service; and
   sending a plurality of file synchronization requests to the remote data storage service, wherein the plurality of file synchronization requests are sent, based at least in part on a predicted location of the files stored on the remote data storage service, to order processing of the files stored on the remote data storage service in response to the plurality of file synchronization requests.

7. The computer-implemented method of claim 6, wherein the predicted location corresponds to a predicted storage node of the files.

8. The method of claim 7, wherein the order is determined based at least in part on the predicted storage node.

9. The computer-implemented method of claim 6, wherein a maximum amount of pending file synchronization requests is determined based at least in part on a scaling model of the remote data storage service.

10. The computer-implemented method of claim 6, wherein the plurality of file synchronization requests are grouped according to a contention model of the remote data storage service.

11. The computer-implemented method of claim 6, further comprising:
   identifying accumulated error caused by a failure in at least one of the plurality of file synchronization requests.

12. The computer-implemented method of claim 6, wherein the file synchronization requests are sent at a rate and order determined based at least in part on a type of storage used by the remote data storage service.

13. The computer-implemented method of claim 6, wherein the plurality of file synchronization requests are sent over a plurality of communications channels.

14. A non-transitory computer-readable storage medium comprising executable instructions that, as a result of being executed by one or more processors of a computer system, cause the computer system to at least:
   generate a listing of files stored on a data volume by at least executing a plurality of threads corresponding to directories of the data volume;
   identify a plurality of files stored on the data volume to synchronize with files stored on a remote data storage service, the identifying based at least in part on comparing files in the listing of files to cached data indicative of files stored on the remote data storage service; and send a plurality of file synchronization requests to the remote data storage service, the plurality of file synchronization requests sent, based at least in part on a predicted storage location of the files stored on the remote data storage service, to order processing of files on the remote data storage service in response to the plurality of file synchronization requests.

15. The non-transitory computer-readable storage medium of claim 14, comprising further instructions that, as a result of being executed by the one or more processors, cause the computer system to:

determine to synchronize a local file based at least in part on the predicted storage location.

16. The non-transitory computer-readable storage medium of claim 14, wherein the order is determined based at least in part on a predicted storage node of the file.

17. The non-transitory computer-readable storage medium of claim 14, wherein a file synchronization requests are sent at a rate based at least in part on a scaling model of the remote data storage service.

18. The non-transitory computer-readable storage medium of claim 14, wherein the plurality of file synchronization requests are grouped according to a contention model of the remote data storage service.

19. The non-transitory computer-readable storage medium of claim 14, comprising further instructions that, as a result of being executed by the one or more processors, cause the computer system to:

identify a plurality of errors caused by a failure in at least one of the plurality of file synchronization requests; and correct the plurality of errors by at least sending a second plurality of file synchronization requests.

20. The non-transitory computer-readable storage medium of claim 14, wherein a file synchronization request comprise data corresponding to the contents of a file and at least one attribute of the file.

\* \* \* \* \*